DEVICE FOR THE FINE ADJUSTMENT OF TAPE POSITION IN A TAPE RECORDER

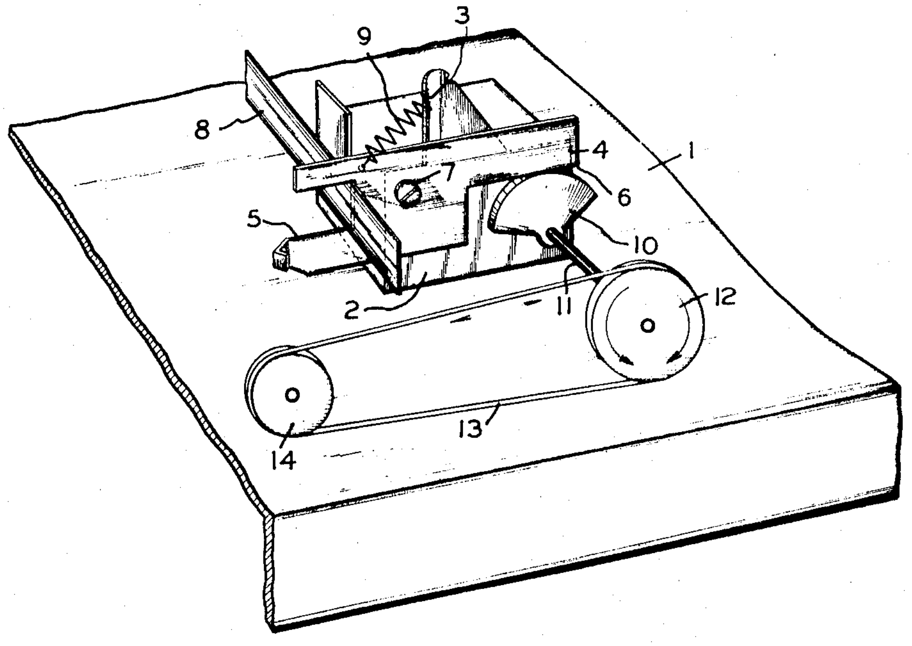
INVENTOR.
TAKEHIKO YAMADA
BY
Wenderoth, Lind & Ponack
ATTORNEYS 3,625,076

Takehiko Yamada, Osaka, Japan, assignor to Orion Electric Co., Ltd., Osaka, Japan Filed Nov. 14, 1969, Ser. No. 876,916
Claims priority, application Japan, Feb. 3, 1969, 44/10,006
Int. Cl. F16h *27/02;* G11b *5/86, 5/00*
U.S. Cl. 74—89 1 Claim

ABSTRACT OF THE DISCLOSURE

A device for making fine adjustments of a tape position includes a guide mounting plate fixed to a frame. A guide plate pivots around a pin on the guide mounting plate. One end of the guide plate has a slot through which a tape runs. The other end of the guide plate has a cam engaging surface which contacts a cam mounted on a rotatable shaft.

BACKGROUND OF THE INVENTION

The present invention relates to a device for the fine adjustment of tape position in a tape recorder, and more specifically contemplates making a fine adjustment of the tape position in relation to the tape recorder head by the simple operation of turning an adjusting knob which is disposed at the exterior of the frame.

It is often very desirable to be able to make very fine and precise adjustments of the position of the tape in a tape recorder.

It is the object of the present invention to provide a device for accomplishing such an adjustment. This object is accomplished by the provision of a tape guide plate pivotally mounted on a guide mounting plate. The guide plate has a slot through which the tape runs and a cam engaging portion which is contacted by a cam mounted on a shaft. The shaft is adapted to be rotated a desired amount. The cam thus causes the guide plate to pivot, thereby finely adjusting the position of the tape.

Other objects and features of the invention will be made clear by the following description taken together with the accompanying drawings.

BRIEF DESCRIPTION OF THE DRAWINGS

The single figure is a perspective view illustrating a preferred embodiment in accordance with the present invention of a device for fine adjustment of the tape position in a tape recorder.

The structure of the present invention will now be described with reference to the accompanying drawing in which a preferred embodiment is shown. Designated at 1 is a frame to which a guide mounting plate 2 is fixedly attached. At the tip of an upwardly projecting part of the guide mounting plate 2, there is provided a cutout 3 for holding a spring 9. Numeral 4 indicates a tape guide plate providing at one end thereof a U-shaped slot 5 through which a tape 8 passes and at the other end thereof a key-shaped cam engaging portion 6. The guide plate 4 is attached to the guide mounting plate 2 with its center portion pivotally supported on a pin 7. The spring 9 is provided between the cutout 3 on the guide mounting plate 2 and the upper portion above the cut 5 of the tape guide plate 4 so as to urge the guide plate into clockwise rotation about the pin 7 at all times. An approximately sectorial adjusting cam 10 is mounted on a shaft 11, and the shaft 11 is rotatably supported on the guide mounting plate 2. A pulley 12 is provided at the end of the shaft 11 and is associated by means of a belt 13 with a pulley 14 of an adjusting knob (not shown) outside the frame.

The arc of the sector of the adjusting cam 10 is in contact with the cam engaging portion 6 of the tape guide plate 4 so as to move the tape guide plate 4 pivotally on the pin 7 in pressing contact therewith as the shaft 11 is driven.

Although the cam driving means, which comprises the shaft 11, pulleys 12, 14, etc. is disposed on the front side of the tape guide plate 4 in the present embodiment and in the drawing, the provision is not limited to this position but it may also be placed on the back side of the guide mounting plate 2, as well as on both sides.

The operation of the present invention will now be described. Accordingly, when the adjusting knob provided externally of the frame is turned, with the tape 8 passing through the U-shaped cut 5 of the tape guide plate 4, the pulley 14 is driven to cause the pulley 12 to revolve either in the clockwise or counterclockwise direction (as shown by the arrows) by means of the dial chord 13, the torque of the pulley 12 further being transmitted through the shaft 11 to the adjusting cam 10. In accordance with the rotation of the shaft 11, the adjusting cam 10 mounted on the shaft 11 presses against cam engaging portion 6 of the tape guide plate 4. This causes tape guide plate 4 to pivot around pin 7, thereby achieving upward or downward fine adjustment of the position of the tape 8. Thus, the present device has outstanding advantages that the above operation can be readily effected simply by turning the adjusting knob and that the device is easy to manufacture because of its simple structure.

Although a single embodiment of the invention has been described in detail, such description is intended to be illustrated only, and not restrictive, since many details of the construction of the invention may be altered or modified without departing from the spirit or scope of the invention.

What is claimed is:

1. A device for the fine adjustment of the tape position in a tape recorder comprising a frame, a guide mounting plate positioned on said frame and having pin thereon, a guide plate mounted to pivot around said pin, said guide plate having at one end thereof a slot for guiding said tape and at the other end thereof a cam engaging portion, a cam means adapted to engage said cam engaging portion and mounted on a shaft, means to urge said cam engaging portion into contact with said cam, means to rotate said shaft and said cam whereby said guide plate pivots around said pin and said tape position is finely adjusted, said means to rotate said shaft comprising a first pulley mounted on said shaft, a belt operably connected to said first pulley, a second pulley operably connected to said belt, and adjusting knob means for rotating said second pulley.

References Cited

UNITED STATES PATENTS

| | | | |
|---|---|---|---|
| 3,471,653 | 10/1969 | Kawata | 179—100.2 |
| 3,452,162 | 6/1969 | Ward | 179—100.2 |

WILLIAM F. O'DEA, Primary Examiner

W. S. RATLIFF, Jr., Assistant Examiner

U.S. Cl. X.R.

179—100.2 MD; 274—4